Patented Nov. 11, 1952

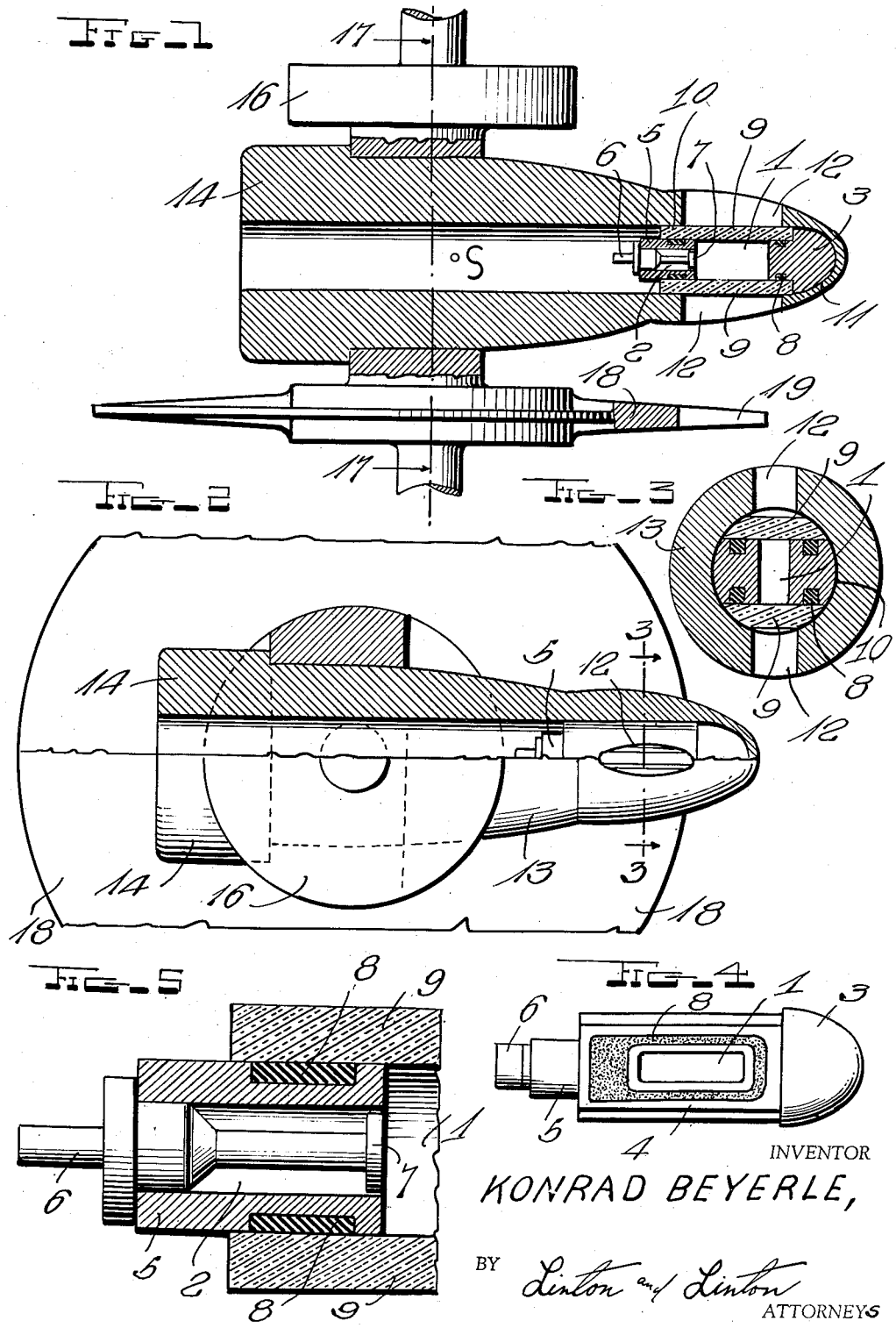

2,617,585

UNITED STATES PATENT OFFICE 2,617,585

ROTATING SYSTEM FOR OBSERVATION CENTRIFUGES FOR THE DETERMINATION OF MOLECULAR WEIGHT

Konrad Beyerle, Gottingen, Germany

Application March 31, 1950, Serial No. 153,112

6 Claims. (Cl. 233—26)

The present invention is directed to a rotating system for observation centrifuges for the determination of molecular weight. The importance ascribed to the sedimentation of suspensions of large molecules in strong centrifugal fields for purposes of analysis had led to the development of centrifuges provided with optical devices to observe the sedimentation. These observation centrifuges allow the measuring of either the velocity of sedimentation, or the distribution of concentration produced by a prolonged influence of a certain centrifugal field; there is made a distinction between dynamical and statical procedures.

In the conventional arrangement of the rotating system the inner parts of the cell are surrounded by a cylindrical cell bushing arranged parallel to the rotational axis of the centrifuge at a definite radial distance. The entire unit is inserted into a bore near the periphery of a disc-shaped rotor of a material as strong as possible. The separating effect required for scientific purposes and the mass of the cells hitherto designed cause centrifugal forces which place a stress on the rotors of the known apparatus up to the limit of their ability to withstand said forces before disintegrating. Therefore occasional collapse occurs rendering the operation thereof dangerous and expensive everything that could remedy these deficiencies by using high quality material has been tried for sometime. Progress can thus only be expected by providing new forms for the highly stressed parts and this is in fact attained by the rotating system described below.

According to the invention a strong oblong tube-shaped receptacle takes up the centrifugal forces of the cell. This receptacle also serves the purpose of holding together the cell like the cylindrical bushing of the conventional design but its longitudinal axis is directed normally to the rotational axis of the centrifuge contrarily to the above cell bushing. The receptacle is closed at its peripheral end by a curved bottom similar to a calotte while its open end is on the opposite side of the rotational axis of the centrifuge and so sized that the common center of gravity of receptacle and cell lies near the rotational axis. Finally the receptacle is connected with the motor of the centrifuge by a suitable shaped rotating part having a bore directed normal to the rotational axis.

The inner parts of the cell are inserted through the open end of the said receptacle. Their centrifugal force is transmitted by a spherical or ellipsoidal pressure cap fitting to the inner surface of the curved bottom of the receptacle. Near to the bottom of said receptacle there are provided radial slot-shaped openings for letting through the light beam for the observation of the contents of the cell. In order to cut off disturbing light rays a diaphragm with a radial slot completes the rotating system.

The primary improvement of my new arrangement is in the mass of the cell being reduced considerably, for the oblong shape of the receptacle in a radial direction gives a much better adaptation of all parts of the cell to the column of liquid within the cell.

The second important improvement concerns the manner of taking up the centrifugal forces of the cell namely by stressing the calotte of the receptacle in all directions. The corresponding peripheral parts of the conventional rotors were stressed in one direction only. The weakness created by this incomplete use of the strength of the material could not be counterbalanced simply by enlarging the cross-sections of the outer parts of the rotor, because the distribution of tensile stresses becomes the more non-uniform as the cross-sections increase and because the additional masses will load the central cross-sections of the rotor with centrifugal forces to an undesirable degree.

Finally the invention involves the improvement of subdividing the inner volume of the cell into two chambers communicating with each other over a flow resistance. The chamber situated farthest from the rotational axis is the observation chamber, while the chamber nearer to the rotational axis serves for taking up gas bubbles. Due to the small dimensions of the connection between said chambers the turbulent motion of liquid produced in vibrated vessels by bubbles or by a free surface will not spread into the observation chamber troubling the sedimentation. For a given radial length of the observation chamber the additional bubble chamber would lead to an increased diameter of the conventional cylindrical cell bushing thus causing an undesirable raising of the mass of the cell in contrast to the new oblong radially directed shape. Therefore the arrangement of a bubble chamber is an immediate technical consequence of the new form of the rotating system.

One form of the present invention is illustrated by the following figures:

Fig. 1 shows a cross section along the rotational axis of the centrifuge,

Fig. 2 shows a plan view partially in section of the system,

Fig. 3 shows a section through receptacle and cell on the plane A—B of Fig. 2,

Fig. 4 shows the observation chamber to be inserted into the receptacle with the windows removed, Fig. 5 shows a section (enlarged scale) through the filling orifice of the cell together with the plug.

The observation chamber 1 and the bubble chamber 2, both filled with the preparation, are formed by the frame-shaped central part 4 extending at its outer end in the pressure cap 3 and at its inner end in the filling orifice 5. The cell is filled, emptied, and cleaned by means of a syringe introduced through 5. An internal rod-shaped elongation of the plug 6 closing the orifice carries the plate 7. Between the periphery of plate 7 and the inner surface of the filling orifice a radial clearance exists serving as a connection between chambers 1 and 2. 8 is a packing of rubber or some other elastic material, sealing the rectangular glass or rock-crystal windows 9 that cover the cell on either side. In the case of high centrifugal forces the rubber will behave like a rather viscous liquid of higher density than the contents of the observation chamber. The space filled with rubber extends towards the axis of rotation enough above the surface of the liquid in chamber 2 so that the rubber will be entirely pressed against central part 4 and windows 9 by an amount exceeding the hydrostatic pressure of the preparation within the cell at all speeds. If necessary this effect of the rubber packing can be increased by adding weighty admixtures thereto. The central part 4 of the cell together with the side portions of windows 9 are surrounded by a sleeve 10 of soft material to prevent local mechanical overloadings of surfaces. 11, 12, 13, 14 is the receptacle inserted in a normal direction to the rotational axis 17—17 in a bore of the rotating part 16. It has the shape of an outwardly tapered tube closed at its peripheral end by the curved bottom 11. 12 are slot-shaped openings for the passage of the light beam. The cross-section of the receptacle gradually increases towards the rotational axis according to Fig. 1 and 2, and is strengthened on the opposite side of that axis by the head 14 to counterbalance the centrifugal forces of the rest of the receptacle and of the cell. In operating position as illustrated by Figs. 1 and 2 the common center of gravity S of receptacle and cell is slightly shifted from the axis of rotation causing the head 14 to be pressed against the rotating part 16. Due to a corresponding opposite force, part 16 exerts a contrary centrifugal force of such an amount that no resulting centrifugal force is transmitted to the bearings of the centrifuge.

18 is the diaphragm with the radial slot 19 situated beneath or above the observation openings 12.

What I claim is:

1. An observation centrifuge for the determination of molecular weight comprising in combination a rotatable member having a bore formed therethrough transversely to its axis of rotation and an oblong one-piece cylindrical receptacle slidably positioned through said bore, said receptacle having an end portion forming a shoulder limiting the movement of said receptacle through said bore and placing the center of gravity of said receptacle near the axis of rotation of said rotatable member and said receptacle having site openings for observing the interior of said receptacle during rotation thereof.

2. An observation centrifuge for the determination of molecular weight comprising in combination a rotatable member having a bore formed therethrough transversely to its axis of rotation and an oblong one-piece cylindrical receptacle slidably positioned through said bore and having one end thereof formed with a round bottom portion, said receptacle having the other and open end portion thereof forming a counterweight, said receptacle further having a shoulder formed on the periphery thereof for contacting said rotatable member and limiting the movement of said receptacle through said bore and said receptacle having site openings for observing the interior of said rounded bottom portion of said receptacle during rotation thereof.

3. An observation centrifuge as claimed in claim 1, wherein said shoulder is formed and positioned on said receptacle for being pressed against said rotatable member during rotation thereof and thereby displacing the center of gravity of said receptacle slightly from the rotational axis of the centrifuge towards the bottom of said receptacle.

4. An observation centrifuge as claimed in claim 2 wherein said receptacle is formed with the wall thereof gradually increasing in cross-section from said round bottom towards the portion thereof positioned at the rotational axis of said rotatable member.

5. An observation centrifuge as claimed in claim 2, wherein a cell for containing the material to be tested is detachably mounted within said receptacle and reinforced by the walls of said receptacle against internal pressures during rotation of the centrifuge.

6. An observation centrifuge as claimed in claim 2, wherein a cell for containing the material to be tested is detachably mounted within said receptacle and reinforced by the walls of said receptacle against internal pressures during rotation of the centrifuge, said cell being subdivided into two chambers located radially relative to the centrifuge one behind the other and in communication connection with each other and fluid flow resisting means positioned in said communicating connection between said chambers.

KONRAD BEYERLE.

REFERENCES CITED

The following references are of record in the file of this patent:

UNITED STATES PATENTS

| Number | Name | Date |
|---|---|---|
| 1,648,369 | Svedberg et al. | Nov. 8, 1927 |
| 2,068,476 | Thomas | Jan. 19, 1937 |
| 2,209,723 | Ayres | July 30, 1940 |
| 2,340,825 | Stern | Feb. 1, 1944 |